United States Patent
Wu

(10) Patent No.: US 11,849,418 B2
(45) Date of Patent: Dec. 19, 2023

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/147,704

(22) Filed: Dec. 29, 2022

(65) Prior Publication Data

US 2023/0199686 A1 Jun. 22, 2023

Related U.S. Application Data

(63) Continuation of application No. PCT/CN2020/118983, filed on Sep. 29, 2020.

(51) Int. Cl.
*H04W 56/00* (2009.01)

(52) U.S. Cl.
CPC ..... *H04W 56/004* (2013.01); *H04W 56/0035* (2013.01)

(58) Field of Classification Search
CPC ......... H04W 56/0045; H04W 72/0453; H04W 56/0005; H04W 56/0015; H04W 52/36; H04W 76/11; H04W 74/008; H04W 74/0891; H04W 72/23; H04W 74/0833; H04W 74/002; H04L 41/0803; H04L 5/0055; H04L 1/1848; H04L 1/1854; H04L 1/1819; H04L 1/1896; H04L 5/0044

See application file for complete search history.

(56) References Cited

U.S. PATENT DOCUMENTS

| | | | |
|---|---|---|---|
| 11,399,329 B2* | 7/2022 | Shih | H04W 36/0069 |
| 2016/0112975 A1 | 4/2016 | Dinan | |
| 2016/0270019 A1 | 9/2016 | Dinan | |
| 2019/0215712 A1 | 7/2019 | Babaei et al. | |
| 2019/0342887 A1 | 11/2019 | Tang | |
| 2020/0260445 A1* | 8/2020 | Jeong | H04L 5/0098 |
| 2020/0337010 A1* | 10/2020 | Wang | H04W 56/0045 |

(Continued)

FOREIGN PATENT DOCUMENTS

| | | |
|---|---|---|
| CN | 104640118 | 5/2015 |
| CN | 110831145 | 2/2020 |
| CN | 111565472 | 8/2020 |

OTHER PUBLICATIONS

Samsung, "UL synchronization maintenance for SCell," 3GPP TSG-RAN2#75 meeting, R2-114164, Aug. 2011.

(Continued)

*Primary Examiner* — Jung Liu
(74) *Attorney, Agent, or Firm* — Hodgson Russ LLP

(57) ABSTRACT

In a wireless communication method, a terminal device obtains a first uplink (UL) alignment timer, where the first UL alignment timer corresponds to a first timing advance group (TAG), the first TAG corresponds to a first serving cell group, the first serving cell group comprises at least one serving cell, and the first UL alignment timer is used for UL synchronization maintenance for the at least one serving cell in the first serving cell group.

16 Claims, 5 Drawing Sheets

(56) References Cited

U.S. PATENT DOCUMENTS

2021/0392694 A1* 12/2021 Babaei .............. H04W 72/0453
2022/0272764 A1* 8/2022 Agiwal ................ H04W 52/36

OTHER PUBLICATIONS

WIPO, International Search Report and Written Opinion for International Application No. PCT/CN2020/118983, Jun. 24, 2021.
Moderator (Thales), "Feature lead Summary on enhancements on UL time and frequency synchronization for NR NTN," 3GPP TSG-RAN WG1 Meeting #102-e, R1-2007290, Aug. 2020.
Ericsson, "Timing advance in NR," 3GPP TSG-RAN WG2 #99bis, Tdoc R2-1711168 (revision of R2-1708185), Oct. 2017.
EPO, Extended European Search Report for EP Application No. 20955572.1, dated Oct. 19, 2023.

\* cited by examiner

WIRELESS COMMUNICATION METHOD, TERMINAL DEVICE, AND NETWORK DEVICE

CROSS-REFERENCE TO RELATED APPLICATION(S)

This application is a continuation of International Application No. PCT/CN2020/118983, filed Sep. 29, 2020, the entire disclosure of which is incorporated herein by reference.

TECHNICAL FIELD

This disclosure relates to the field of communication, and particularly relates to a wireless communication method, a terminal device, and a network device.

BACKGROUND

A non-terrestrial network (NTN) generally provides a communication service for a terrestrial user by means of satellite communication. Satellite communication has many unique advantages over terrestrial cellular network communication. First, satellite communication is not limited by a geographical position of the user. Second, satellite communication has a great social value. Third, the satellite communication can be realized at a far communication distance, and the cost of communication is not significantly increased when the communication distance is increased. Finally, satellite communication is stable and robust against natural disasters. However, in an NTN system, how to control uplink synchronization for a serving cell is a technical problem to be solved urgently in the present disclosure.

SUMMARY

Disclosed herein are implementations of a wireless communication method, a terminal device, and a network device, so as to resolve the problem of how to control uplink synchronization for a serving cell in a non-terrestrial network (NTN) system.

In a first aspect, a wireless communication method is provided. The method includes: a terminal device obtains a first uplink (UL) alignment timer, the first UL alignment timer corresponds to a first timing advance group (TAG), the first TAG corresponds to a first serving cell group, the first serving cell group includes at least one serving cell, and the first UL alignment timer is used for UL synchronization maintenance for the at least one serving cell in the first serving cell group.

In a second aspect, a terminal device is provided. The terminal device includes a transceiver, a processor, and a memory. The memory stores computer programs, the processor is configured to invoke the computer programs stored in the memory to cause the transceiver to obtain a first UL alignment timer for a terminal device, the first UL alignment timer corresponds to a first TAG, the first TAG corresponds to a first serving cell group, the first serving cell group includes at least one serving cell, and the first UL alignment timer is used for UL synchronization maintenance for the at least one serving cell in the first serving cell group.

In a third aspect, a network device is provided. The network device includes a transceiver, a processor, and a memory. The memory stores computer programs, the processor is configured to invoke the computer programs stored in the memory to cause the transceiver to configure a first UL alignment timer for a terminal device, the first UL alignment timer corresponds to a first TAG, the first TAG corresponds to a first serving cell group, the first serving cell group includes at least one serving cell, and the first UL alignment timer is used for UL synchronization maintenance for the at least one serving cell in the first serving cell group.

DETAILED DESCRIPTION

Figure 1A:
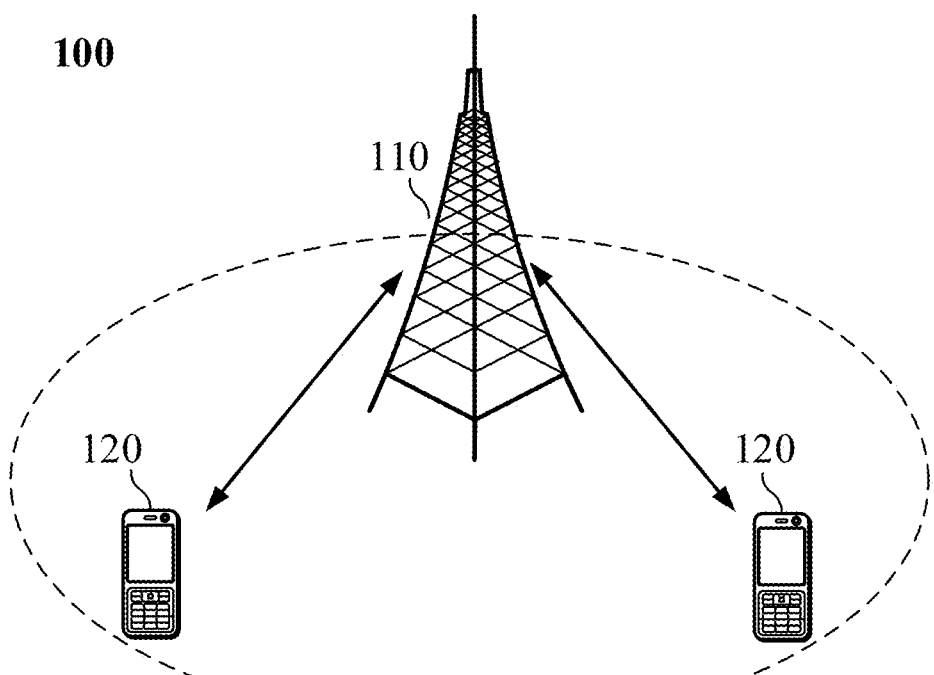
FIG. 1A is an architecture diagram of a communication system provided in implementations of the disclosure.

The following describes the technical solutions in implementations of the present disclosure with reference to the accompanying drawings in implementations of the present disclosure. Apparently, the described implementations are a part rather than all of the implementations of the present disclosure. All other implementations obtained by a person of ordinary skill in the art based on the implementations of the present disclosure without creative efforts shall belong to the scope of protection of the present disclosure.

Technical solutions in implementations of the present disclosure may be applied to various communication systems, such as a global system of mobile communication (GSM), a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, an advanced system of NR system, an LTE-based access to unlicensed spectrum (LTE-U) system, an NR-based access to unlicensed spectrum (NR-U) system, a non-terrestrial network (NTN) system, an universal mobile telecommunication system (UMTS), a wireless local area network (WLAN), wireless fidelity (WiFi), 5th-generation (5G) system, and other communication systems.

Generally, a conventional communication system supports a limited number of connections and is easy to be implemented. However, with the development of communication technologies, the mobile communication system will support not only traditional communication, but will also support, for example, device to device (D2D) communication, machine to machine (M2M) communication, machine type communication (MTC), vehicle to vehicle (V2V) communication, or vehicle to everything (V2X) communication, etc., and implementations of the disclosure can also be applied to these communication systems.

Optionally, the communication system in implementations of the disclosure may be applied to a carrier aggregation (CA) scenario, may also be applied to a dual connectivity (DC) scenario, and may also be applied to a standalone (SA) network deployment scenario.

Optionally, the communication system in implementations of the disclosure can be applied to an unlicensed spectrum, where the unlicensed spectrum may also be considered as a shared spectrum. Alternatively, the communication system in implementations of the disclosure may also be applied to a licensed spectrum, where the licensed spectrum may also be considered as a non-shared spectrum.

Optionally, implementations of the disclosure may be applied to an NTN system, and may also be applied to a terrestrial communication network (TN) system.

Various implementations of the disclosure are described in conjunction with a network device and a terminal device. The terminal device may also be referred to as a user equipment (UE), an access terminal, a user unit, a user station, a mobile station, a remote station, a remote terminal, a mobile device, a user terminal, a terminal, a wireless communication device, a user agent, a user device, or the like.

The terminal device can be a station (ST) in WLAN, a cellular phone, a cordless phone, a session initiation protocol (SIP) phone, a wireless local loop (WLL) station, a personal digital assistant (PDA) device, a handheld device or an on-board device with wireless communication functions, a computing device, a wearable device, or other processing devices connected to a wireless modem, a terminal device in a next-generation communication system such as an NR network, or a terminal device in the future evolved public land mobile network (PLMN) network, etc.

In implementations of the disclosure, the terminal device can be deployed on land, including indoor or outdoor, handheld, wearable or vehicle mounted; it can also be deployed on the water (such as ships); or it can also be deployed in the air (such as aircraft, balloons, satellites, etc.)

In implementations of the disclosure, the terminal device can be a mobile phone, a tablet computer, a computer with wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city or smart home. The terminal device involved in implementations of the disclosure can also be called a terminal, a user equipment (UE), an access terminal equipment, a vehicle mounted terminal, an industrial control terminal, a UE unit, a UE station, a mobile station, a remote station, a remote terminal device, a mobile device, a UE terminal device, a wireless communication device, a UE agent or UE device, etc. The terminal device can be fixed or mobile.

As an example rather than limitation, in implementations of the disclosure, the terminal device can also be a wearable device. The wearable device can also be called an intelligent wearable device, which is the general name of wearable devices developed by applying wearable technology to intelligently design daily wear, such as glasses, gloves, watches, clothing and shoes. The wearable device is a portable device that is directly worn on the body of a user or integrated into the clothes or accessories of the user. The wearable device is not only a hardware device, but also can implement powerful functions through software support, data interaction, and cloud interaction. Broadly speaking, the wearable smart device includes devices with full function, large size, and can achieve complete or partial functions independent of smart phones, for example, a smart watch or smart glasses, etc. The wearable smart device also includes devices which focus only on a certain type of application function and needs to be used in cooperation with other devices such as a smart phone, for example, various types of intelligent wristband and intelligent jewelry for performing vital sign monitoring, etc.

In implementations of the disclosure, a network device may be a device for communicating with a mobile device, and the network device may be an access point (AP) in WLAN, a base transceiver station (BTS) in GSM or CDMA, a base station (Node B, NB) in WCDMA, and an evolved Node B (eNB or eNodeB) in LTE, or a relay station or an access point, or a vehicle-mounted device, a wearable device and a network device (gNB) in an NR network, or a network device in a future evolved PLMN network or a network device in an NTN network, or the like.

As an example rather than limitation, in implementations of the disclosure, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geosynchronous earth orbit (GEO) satellite, a high elliptical orbit (HEO) satellite, or the like. Optionally, the network device may also be a base station disposed on land or water area.

In implementations of the disclosure, a network device can provide a service for a cell, and a terminal device uses a transmission resource (for example, frequency domain resources, in other words, spectrum resources) used by the cell to communicate with the network device, and the cell may be a cell corresponding to the network device (for example, a base station). The cell may belong to a macro base station, and may also belong to a base station corresponding to a small cell. The small cell herein may include a metro cell, a micro cell, a pico cell, a femto cell, etc. These small cells have the characteristics of small coverage area and low transmission power, and are suitable for providing a high-rate data transmission service.

Exemplarily, FIG. 1A is an architecture diagram of a communication system provided in implementations of the disclosure. As illustrated in FIG. 1A, a communication system 100 may include a network device 110, the network device 110 can be a device in communication with a terminal device 120 (also known as a communication terminal, terminal). The network device 110 may provide communication coverage for a particular geographical area, and may communicate with terminal devices located within that coverage area.

FIG. 1A exemplarily shows a network device and two terminal devices. Optionally, the communication system 100 may include multiple network devices, and another number of terminal devices may be located within the coverage of each network device. Implementations of the present disclosure are not limited thereto.

Figure 1B:
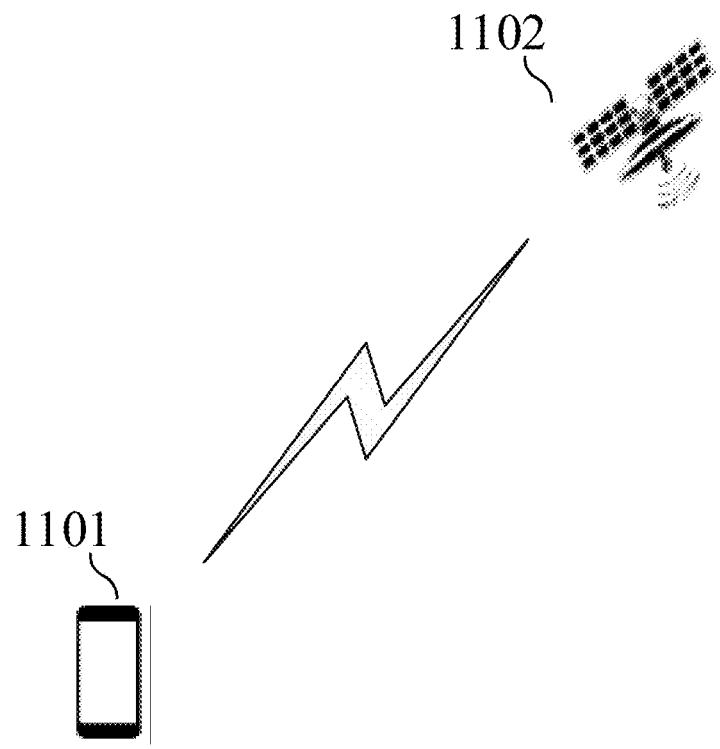
FIG. 1B is an architecture diagram of another communication system provided in implementations of the disclosure.

Exemplarily, FIG. 1B is an architecture diagram of another communication system provided in implementations of the present disclosure. Referring to FIG. 1B, the communication system includes a terminal device 1101 and a satellite 1102, and wireless communication may be performed between the terminal device 1101 and the satellite 1102. A network formed between the terminal device 1101 and the satellite 1102 may also be referred to as an NTN. In the architecture of the communications system shown in FIG. 1B, the satellite 1102 may have functions of a base station, and direct communication may be performed between the terminal device 1101 and the satellite 1102. In a system architecture, the satellite 1102 may be referred to as a network device. Optionally, a communication system may include multiple network devices 1102, and other numbers of terminal devices may be in the coverage of each network device 1102. Implementations of the present disclosure are not limited thereto.

Figure 1C:
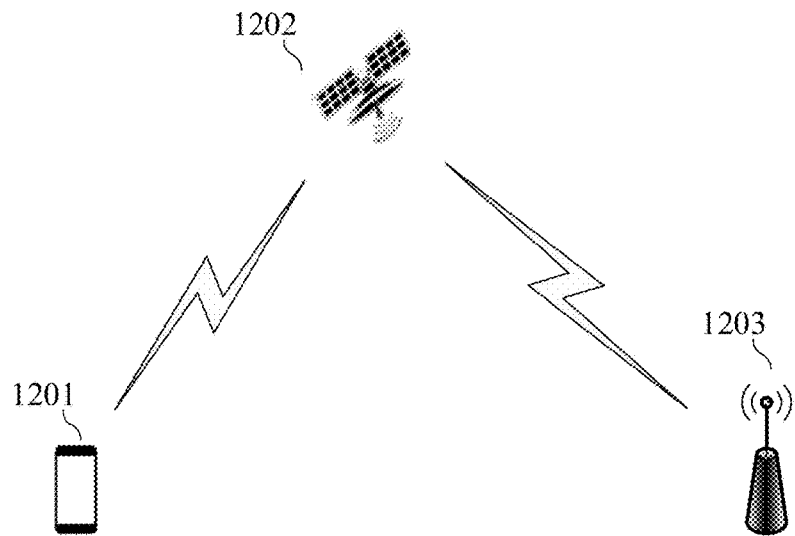
FIG. 1C is an architecture diagram of another communication system provided in implementations of the disclosure.

Exemplarily, FIG. 1C is an architecture diagram of another communication system provided in implementations of the present disclosure. Referring to FIG. 1C, the communication system includes a terminal device 1201, a satellite 1202, and a base station 1203, where wireless communication may be performed between the terminal device 1201 and the satellite 1202, and communication may be performed between the satellite 1202 and the base station 1203. The network formed among the terminal device 1201, the satellite 1202, and the base station 1203 may also be referred to as an NTN. In the architecture of the communication system shown in FIG. 1C, the satellite 1202 may not have the function of a base station, and communication between the terminal 1201 and the base station 1203 needs to be relayed through the satellite 1202. In this system architecture, the base station 1203 may be referred to as a network device. Optionally, a communication system may include multiple network devices 1203, and other numbers of terminal devices may be within the coverage of each network device 1203, implementations of the present disclosure are not limited thereto.

It should be noted that, FIG. 1A to FIG. 1C merely illustrate a system to which the present disclosure is applicable in an exemplary manner. Definitely, the method shown in implementations of the present disclosure may also be applicable to other systems, for example, a 5G communication system and an LTE communication system, which is not specifically limited herein.

Optionally, the wireless communication system shown in FIG. 1A to FIG. 1C can further include other network entities such as a mobility management entity (MME), and an access and mobility management function (AMF), which are not limited herein.

It should be understood that a device having a communication function in a network/system in implementations of the disclosure may be referred to as a communication device. Taking the communication system 100 shown in FIG. 1A as an example, the communication device may include the network device 110 and the terminal device 120 which have a communication function, where the network device 110 and the terminal device 120 may be specific devices described above, which will not be repeated. The communication device can further include other devices in the communication system 100, such as a network controller, a mobility management entity, and other network entities, which is not specifically limited herein.

It should be understood that, in this specification, the terms "system" and "network" are generally used interchangeably. The term "and/or" is only an association relationship for describing associated objects, and indicates that three relationships may exist. For example, A and/or B may indicate three cases: A exists separately, A and B exist simultaneously, and B exists separately. In addition, the character "/" in this description generally indicates that the former and latter associated objects are in an "or" relationship.

It should be understood that, the term "indicate" mentioned herein may be indicating directly, indicating indirectly, or representing having an association. For example, A indicates B, which may be that A indicates B directly, for example, B may be acquired through A; or A indicates B indirectly, for example, A indicates C, and B may be acquired through C; may also indicate that there is an association relationship between A and B.

In the description, the term "corresponding" may indicate that there is a direct correspondence relationship or indirect correspondence relationship between the two, may also indicate that there is an association relationship between the two, and may also indicate that there is a relationship between the two, such as indicating and being indicated, configuring and being configured.

Optionally, the indication information referred to in implementations of the disclosure includes physical layer signaling such as at least one of DCI, radio resource control (RRC) signaling, and a media access control control-element (MAC CE).

Optionally, in implementations of the disclosure, high layer parameters and high layer signaling include at least one of radio resource control (RRC) signaling and an MAC CE.

For better understanding of implementations of the disclosure, UL timing advance (TA) adjustment in an NR system, timing relationship in an NTN system, and UL TA adjustment in the NTN system will be described below.

I. UL TA Adjustment in the NR System

1. TA and TA Group (TAG)

When used in UL transmission of a terminal device, TA means that the terminal device transmits a data packet at a corresponding time in advance according to a corresponding instruction.

In release (Rel) 11 of the LTE-A, the concept of a TA group (TAG) has been introduced since the proposal of carrier aggregation allows different carriers (including a primary carrier and other secondary carriers) supported by a terminal device to have different TA values.

In the TN system, the terminal device may have one or more TAGs. One TAG refers to a serving cell group configured by RRC. A same timing reference cell and a same TA value are used for UL configuration corresponding to this serving cell group. If a TAG includes an MAC entity for a special cell (SpCell), the TAG will be regarded as a primary TAG (PTAG), otherwise, the TAG will be regarded as a secondary TAG (STAG). In a DC scenario, according to a master cell group (MCG) or secondary cell group (SCG) associated with an MAC entity, SpCell accordingly refers to a primary cell (PCell) in an MCG or a primary secondary cell (PSCell) in a SCG. In other scenarios, SpCell refers to PCell.

2. UL Alignment Timer, Timing Advance Command (TAC) MAC CE, and TA Adjustment

The network device will configure high layer parameters such as timeAlignmentTimer through RRC to maintain UL time alignment, where each TAG is configured with one UL alignment timer, to control how long the MAC entity may consider the serving cell associated with this TAG to be UL timing aligned.

When timeAlignmentTimer expires, if the timeAlignmentTimer is associated with a PTAG, (1) flush all hybrid automatic repeat request (HARQ) buffers for all serving cells, (2) notify RRC to release a physical uplink control channel (PUCCH) for all serving cells, if the PUCCH is configured, (3) notify the RRC to release a sounding reference signal (SRS) for all serving cells, if the SRS is configured, (4) clear any preconfigured downlink (DL) transmission and preconfigured UL grant, (5) clear any physical uplink shared channel (PUSCH) resource for semi-persistent channel state information (CSI) report, (6) consider all running timeAlignmentTimer as expired, (7) maintain NTA for all TAGs.

When timeAlignmentTimer expires, if the timeAlignmentTimer is associated with a STAG, then for all serving cells belongs to the STAG, (1) flush all HARQ buffers, (2) notify RRC to release the PUCCH if the PUCCH is configured, (3) notify the RRC to release the SRS if the SRS is configured, (4) clear any preconfigured DL transmission and preconfigured UL grant, (5) clear any PUSCH resource for semi-persistent CSI report, (6) maintain NTA for all TAGs.

The terminal device may perform TA adjustment according to a TAC MAC CE transmitted by the network device. When a TAC MAC CE is received, if the NTA corresponding to the indicated TAG has been applied to a TA adjustment procedure associated with the TAG, the terminal device will use the TAC and NTA to adjust the TA associated with the TAG, and start or restart the timeAlignmentTimer associated with the indicated TAG. The TAC MAC CE contains TAG identification (ID) indication information of 2 bits and TAC indication information of 6 bits, the TAC indication information is used to adjust the TA associated with the TAG. The value of NTA is also used to adjust the TA associated with the TAG. The value of NTA is related to a subcarrier spacing of first UL transmission after receiving a random access response (RAR) by the terminal device.

As an example rather than limitation, the TA adjustment procedure at the terminal device is as follows.

The terminal device is provided with TA offset value for a corresponding serving cell, that is, NTA, offset, for example, the terminal device can be provided with the TA offset value for a serving cell through parameter n-TimingAdvanceOffset by the network device. If the terminal device is not provided with the parameter n-TimingAdvanceOffset for the corresponding serving cell, the terminal device will determine a default TA offset value for the serving cell according to protocols such as TS 38.133.

For Msg 1 or Msg A transmission in a random access response procedure, the terminal device determines TA according to TTA=NTA, offset*Tc, where Tc=1/(Δf max*Nf), Δf max=480000 Hz, Nf=4096. TTA represents the TA for UL transmission.

For UL transmissions other than Msg 1 or Msg A in the random access response procedure, the terminal device determines TA according to TTA=(NTA+NTA, offset)*Tc.

If the TAC indicated in the RAR received by the terminal device is TA, the terminal device determines NTA=TA*16*64/2μ in TAG according to the TA, where TA=0, 1, 2 . . . 3846.

In other cases, if TAC TA is received, the terminal device will adjust NTA according to the TA, NTA_new=NTA_old+ (TA−31)*16*64/2μ, where NTA_old represents the NTA currently adjusted, NTA_new represents the NTA after adjustment, TA=0, 1, 2 . . . 63, μ represents subcarrier spacing configuration, and a subcarrier spacing corresponds to μ is 2μ*15 kHz.

II. Timing Relationship in the NTN System

In the TN system, propagation delay for signal communication is generally less than 1 ms. In the NTN system, since a communication distance between a terminal device and a satellite is very long, a propagation delay of signal communication is very large, which may range from tens of milliseconds to hundreds of milliseconds and is specifically related to a satellite orbit height and a service type of satellite communication. In order to deal with a relatively large propagation delay, a timing relationship of the NTN system needs to be enhanced relative to that of the NR system.

Figure 2:
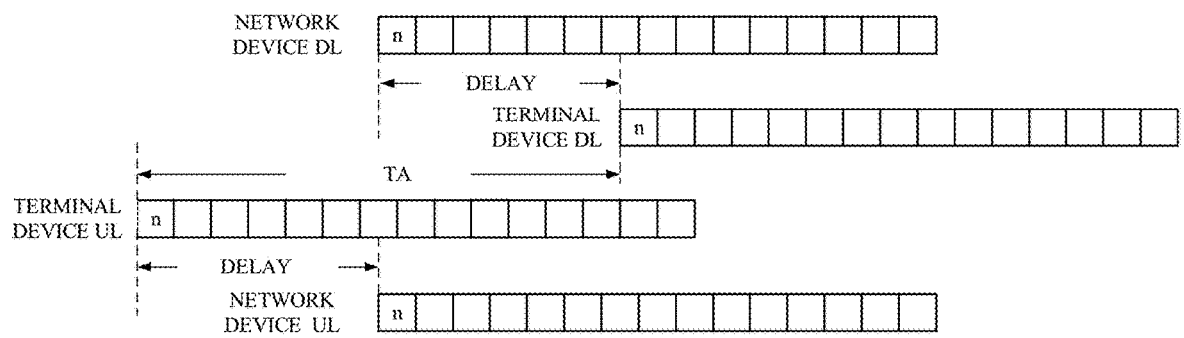
FIG. 2 is a schematic diagram illustrating a timing relationship in an NTN system provided in implementations of the disclosure.
Figure 3:
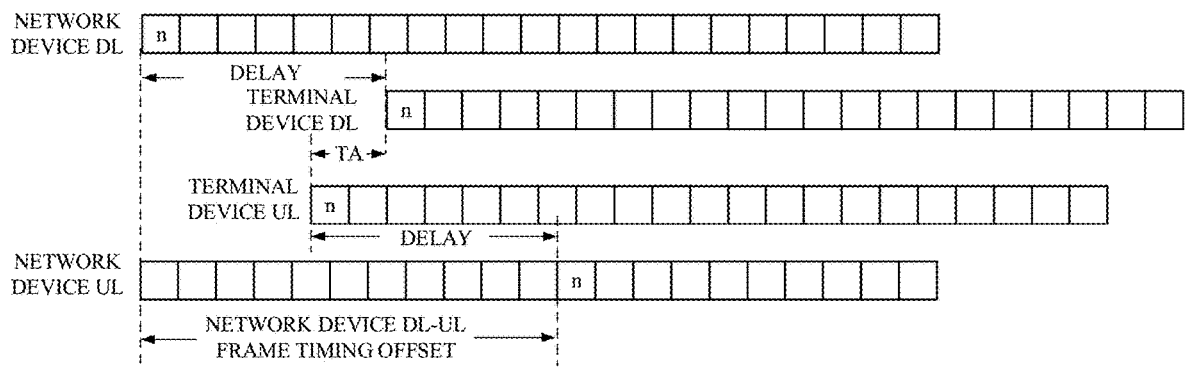
FIG. 3 is a schematic diagram illustrating another timing relationship in an NTN system provided in implementations of the disclosure.

In the NTN system, similar to the NR system, when performing UL transmission, the terminal device needs to consider the influence of TA. Since a propagation delay in a system is relatively large, a range of TA value is also relatively large. When the terminal device is scheduled to perform UL transmission in a timeslot n, considering a round-trip propagation delay, UL transmission is performed in advance, so that a signal may reach a network device side in the timeslot n. Specifically, the timing relationship in the NTN system may include two cases, as shown in FIG. 2 and FIG. 3 below respectively.

Case 1: As illustrated in FIG. 2, similar to the NR system, at the network device side, the UL slot and the DL slot are aligned. Accordingly, in order to align the UL transmission of the terminal device with the UL slot of the network device side, the terminal device needs to use a larger TA value. When performing UL transmission, a larger offset value such as Koffset also needs to be introduced, where Koffset can be determined according to the TA value.

Case 2: As illustrated in FIG. 3, there is an offset value between a DL slot and a UL slot at the network device side. In this case, the terminal device only needs to use one smaller TA value if it is desired to align the UL transmission of the terminal device with the UL slot at the network device side. However, in this case, the network device may require additional scheduling complexity to handle the corresponding scheduling timing sequence.

III. UL TA Adjustment in the NTN System

In the NTN system, UL TA adjustment includes at least one of the following:

(1) The network device indicates a common TA (or location information of a reference point) to the terminal device, and the terminal device performs UL TA adjustment according to the common TA (or the location information of the reference point).

(2) The network device indicates a common TA (or location information of a reference point) to the terminal device, the terminal device obtains TA according to its own global navigation satellite system (GNSS) capability and the common TA (or the location information of the reference point), and performs UL TA adjustment.

(3) The terminal device obtains TA according to its own GNSS capability and performs UL TA adjustment.

As stated above, in the NTN system, how to control UL synchronization for a serving cell is a technical problem to be solved in the present disclosure. In order to solve this technical problem, in this disclosure, uplink synchronization for a serving cell is realized by configuring an uplink alignment timer for a terminal device.

Technical solutions of the disclosure will be detailed below.

Figure 4:
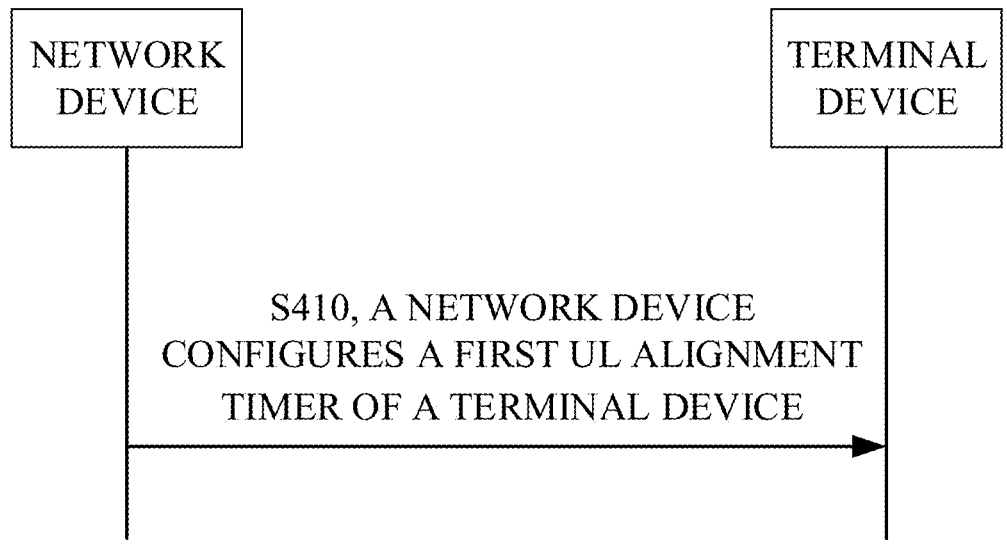
FIG. 4 is an interaction flowchart of a wireless communication method according to an implementation of the present disclosure.

FIG. 4 is an interaction flowchart of a wireless communication method according to an implementation of the present disclosure. Through the method described below, a terminal device can maintain UL synchronization for at least one serving cell in a first serving cell group via a first UL alignment timer, so as to solve the problem of how to control UL synchronization for the serving cell in an NTN system. As illustrated in FIG. 4, the method includes the following.

Step S410: a network device configures a first UL alignment timer of a terminal device.

The first UL alignment timer corresponds to a first TAG, the first TAG corresponds to a first serving cell group, the first serving cell group includes at least one serving cell, and the first UL alignment timer is used for UL synchronization maintenance for the at least one serving cell in the first serving cell group.

Optionally, the wireless communication method can be applied to an NTN system or a TN system, which is not limited herein.

Optionally, the first UL alignment timer can be carried in RRC confirmation information, or can be configured through DCI or MAC CE signaling, which is not limited herein.

Optionally, the network device may configure one or more TAG for the terminal device, and the first TAG is one TAG configured for the terminal device by the network device. The first TAG refers to a serving cell group configured by RRC. For the UL configuration corresponding to this serving cell group, the same timing reference cell and the same TA value are used.

It should be understood that, according to the definition of the first TAG, the first TAG corresponding to the first serving cell group may also be understood as the first TAG being associated with the first serving cell group. The first TAG corresponding to the first serving cell group may also be described as the first TAG having a correspondence relationship with the first serving cell group, which is not limited herein.

In should be understood that, the network device can configure one UL alignment timer for each TAG, and the first UL alignment timer is the UL alignment timer configured for the first TAG by the network device. The first UL alignment timer corresponding to the first TAG may also be described as the first UL alignment timer having a correspondence relationship with the first TAG, which is not limited herein.

Optionally, the first UL alignment timer can be used to control how long an MAC entity may consider a serving cell associated with the first TAG to be UL timing aligned.

Optionally, after expiry of the first alignment timer, for the at least one serving cell included in the first serving cell group, behaviors of the terminal device include at least one of the following, but the disclosure is not limited thereto.
(1) Flushing all HARQ buffers.
(2) Notifying RRC to release a PUCCH, if the PUCCH is configured.
(3) Notifying the RRC to release an SRS, if the SRS is configured.
(4) Clearing any preconfigured DL transmission and preconfigured UL grant.
(5) Clearing any PUSCH resource for semi-persistent CSI report.

For example, after expiry of the first alignment timer, if the first UL alignment timer is associated with PTAG, perform at least one of the following.
(1) Flushing all HARQ buffers for all serving cells.
(2) Notifying RRC to release a PUCCH(s) for all serving cells, if the PUCCH is configured.
(3) Notifying RRC to release an SRS(s) for all serving cells, if the SRS is configured.
(4) Clearing any preconfigured DL transmission and preconfigured UL grant.
(5) Clearing any PUSCH resource for semi-persistent CSI report.
(6) Considering all running time Alignment timers as expired.
(7) Maintaining NTA for all TAGs.

Still another example, after expiry of the first alignment timer, if the first UL alignment timer is associated with STAG, for all serving cells belong to the STAG, perform at least one of the following.
(1) Flushing all HARQ buffers.
(2) Notifying RRC to release a PUCCH, if the PUCCH is configured.
(3) Notifying RRC to release an SRS, if the SRS is configured.
(4) Clearing any preconfigured DL transmission and preconfigured UL grant.
(5) Clearing any PUSCH resource for semi-persistent CSI report.
(6) Maintaining NTA for the STAG.

Based on this, in order to prevent the problem that the first UL alignment timer is prone to expire, optionally, the first alignment timer has a duration configured to be infinity.

It should be noted that, the term "infinity" used herein can also be "infinite". The duration of the first UL alignment timer being configured to infinity can also be described as the terminal device expecting the first UL alignment timer to be configured with an infinite value or configured to the infinity, or the terminal device does not expect the first UL timer to be configured with any value other than an infinite value, which is not limited in the disclosure.

In this disclosure, the terminal device uses the first UL alignment timer for UL synchronization maintenance for the at least one serving cell in the first serving cell group, thereby solving the problem of how to control the UL synchronization for a serving cell in the NTN system. Furthermore, in some optional implementations, since the duration of the first UL alignment timer is configured to be infinity, the first UL alignment timer will not expire, and the MAC entity will not consider the first serving cell group associated with the first UL alignment timer to be UL timing misaligned (that is, out of synchronization), thereby avoiding flushing all HARQ buffers, releasing the PUCCH, releasing the SRS, or clearing preconfigured DL transmission, preconfigured UL grant, and PUSCH resources for semi-persistent CSI report.

As stated before, in the TN system, the terminal device may start or restart the UL alignment timer upon receiving the TAC MAC CE. However, in the NTN system, how to start, restart, or stop the first UL timer still needs to be discussed. Furthermore, as stated before, in the TN system, the TAC MAC CE includes: TAC ID and TAC indication information. In the disclosure, in the NTN system, the TAC MAC CE can be enhanced, or other information can be proposed to achieve TA adjustment, frequency offset information determination, and so on, which will be described blow in detail in implementations.

Implementation 1

Optionally, the terminal device starts or restarts the first UL alignment timer according to first indication information upon receiving the first indication information. The first indication information is associated with the first TAG or the first UL alignment timer.

It should be noted that, the first indication information triggers the terminal device to start or restart the first UL alignment timer.

It should be noted that, the first indication information being associated with the first TAG or the first UL alignment timer refers to: the first indication information being associated with the first TAG, and since the first TAG is associated with the first alignment timer, the first indication information can trigger the terminal device to start or restart the first UL alignment timer.

It should be noted that, the first indication information being associated with the first UL alignment timer refers to: the first indication information being used to trigger the terminal device to start or restart the first UL alignment timer. The first indication information being associated with the first UL alignment timer can also be described as: the first indication information having an association relationship with the first UL alignment timer, or the first indication information corresponding to the first UL alignment timer, or the first indication information having a correspondence relationship with the first UL alignment timer, which is not limited herein.

It should be noted that, as stated before, the first TAG corresponds to the first UL alignment timer, and the first indication information triggers the terminal device to start or restart the first UL alignment timer. Therefore, it can be said that the first indication information is associated with the first TAG. The first indication information being associated with the first TAG can also be described as the first indication information having an association relationship with the first TAG, the first indication information corresponding to the first TAG, or the first indication information having a correspondence relationship with the first TAG, which is not limited herein.

Optionally, the first indication information is used to determine at least one of the following: (1) TA information; (2) frequency offset (FO) information; (3) TA drift information; (4) FO drift information; (5) timing offset information; (6) time reference information; (7) location information of a reference point; (8) an identification (ID) of the first TAG.

It should be noted that, for any one of or any combination of the above information (1)-(8), the first indication information being used to determine the first information or information combination refers to the first indication information being used to indicate the first information or information combination, or the first indication information being used to indicate other information and the other information being used to determine the first information or information combination, which is not limited herein.

Optionally, the foregoing (1) TA information includes at least one of: a cell common TA, a beam common TA, or a feedlink TA.

Optionally, the cell common TA can be a common TA for a serving cell associated with the first TAG.

Optionally, the cell common TA can be a common TA for serving cells corresponding to the first TAG and other TAGs.

Optionally the beam common TA can be common TA corresponding to a first beam for a serving cell associated with the first TAG, where the first beam includes one or more beams.

Optionally, the beam common TA can be a common TA for different beams, and one TAG may correspond to one or more beams.

Optionally, when the TA information is the cell common TA or the beam common TA, after receiving the TA information, the terminal device can perform UL TA adjustment according to the TA information and the GNSS capability of the terminal device. Alternatively, the terminal device can perform UL TA adjustment according to the TA information. Even if the terminal device obtains the TA information, the terminal device may not use the TA information, but performs UL TA adjustment according to its own GNSS capability, which is not limited herein.

It should be noted that, the feedlink may be the feedlink between the base station and the satellite shown in FIG. 1C.

Optionally, the terminal device can determine the TA between the terminal device and the base station according to the feedlink TA. How to determine the TA according to the feedlink TA is not particularly limited herein.

Optionally, the foregoing (2) FO information is configured for the terminal device by the network device, for example, a common FO for a serving cell associated with the first TAG. Optionally, the FO information represents Doppler shift. Optionally, the FO information represents FO between a receiving frequency of the terminal device and a transmitting frequency of a network device. For example, a network device transmits or receives a signal under a carrier frequency of 2 Ghz, and an FO is 1 Khz, such as a terminal device receives or transmits the signal under 2 Ghz+1 Khz=2.001 Ghz.

Optionally, the foregoing (3) TA drift information is used to measure a change of the TA within a unit time. The "unit time" can be in milliseconds, seconds, slots, or the like, which is not limited herein. The TA drift information can be represented as TA drift.

Optionally, the TA drift information can be drift information of the foregoing (1) TA information, that is, drift information of the cell common TA, drift information of the beam common TA, or drift information of the feedlink TA.

Optionally, if the terminal device has obtained the cell common TA information before the current moment, the terminal device can determine the current cell-common-TA information according to the cell common TA before the current moment and the drift information of the cell common TA.

Optionally, after obtaining the current cell-common-TA information, the terminal device can perform UL TA adjustment according to the current cell-common-TA information and the GNSS capability of the terminal device. Alternatively, the terminal device can perform UL TA adjustment according to the current cell-common-TA information. Even if the terminal device obtains the current cell-common-TA information, the terminal device does not need to use the current cell-common-TA information, but performs UL TA adjustment according to its own GNSS capability, which is not limited herein.

Optionally, if the terminal has obtained the beam common TA information before the current comment, the terminal device can determine the current beam-common-TA information according to the beam common TA before the current moment and the drift information of the beam common TA.

Optionally, after obtaining the current beam-common-TA information, the terminal device can perform UL TA adjustment according to the current beam-common-TA information and the GNSS capability of the terminal device. Alternatively, the terminal device can perform UL TA adjustment according to the current beam-common-TA information. Even if the terminal device obtains the current beam-common-TA information, the terminal device does not need to use the current beam-common-TA information, but performs UL TA adjustment according to its own GNSS capability, which is not limited herein.

Optionally, if the terminal has obtained the feedlink TA information before the current comment, the terminal device can determine the current feedlink-TA information according to the feedlink TA before the current moment and the drift information of feedlink TA.

Optionally, the foregoing (4) FO drift information is used to measure the change of the FO information in a unit time, or the FO drift information is Doppler offset drift information, which is used to measure the change of Doppler offset information in a unit time. The "unit time" can be in milliseconds, seconds, slots, or the like, which is not limited herein. The FO drift information can be represented as FO drift.

Optionally, if the terminal device has obtained the FO information before the current moment, the terminal device can determine current FO information according to the FO information before the current moment and the FO drift information.

Optionally, the foregoing (5) Koffset information can be determined according to the TA illustrated in FIG. 2. Optionally, Koffset can be in milliseconds, seconds, slots, or the like. Optionally, an indicated Koffset can be in the unit of a millisecond, the terminal device converts the unit of Koffset from millisecond to slot according to subcarrier spacing configuration. For example, the indicated Koffset is 20 milliseconds, the configured subcarrier spacing is 30 kHz, and according thereto, the terminal device can determine that the Koffset is 40 slots.

Optionally, the foregoing (6) time reference information is absolute time information, and the network device configures the same time reference information for all terminal devices.

The foregoing (7) location information of a reference point can be location information of a satellite or location information of a base station, or can be location information of one point on a link between the satellite and the terminal device, which is not limited herein.

Optionally, after obtaining the location information of the reference point, the terminal device can perform UL TA adjustment according to the location information of the reference point and the GNSS capability of its own. Alternatively, the terminal device can perform UL TA adjustment according to the location information of the reference point. Even if the terminal device obtains the location information of the reference point, the terminal device does not need to use the location information of the reference point, but performs UL TA adjustment according to its own GNSS capability.

Optionally, the foregoing (8) an ID of the first TAG can be used to trigger the terminal device to start or restart the first UL alignment timer.

Optionally, the first indication information is carried in at least one of: a system message, RRC signaling, an MAC CE, a DCI, and a RS.

It should be noted that, since the first indication information can be carried in at least one of: the system message, the RRC signaling, the MAC CE, the DCI, and the RS, the terminal device starting or restarting the first UL alignment timer upon receiving the first indication information can also be described as the terminal device starting or restarting the first alignment timer upon receiving at least one of: the system message, the RRC signaling, the MAC CE, the DCI, and the RS, which is not limited herein.

As an example rather than limitation, the first indication information includes the ID of the first TAG. The terminal device starts or restarts the first UL alignment timer upon receiving the system message, the RRC signaling, the MAC CE, the DCI, or the RS which carries the first indication information.

To be summarized, in this implementation of the disclosure, the terminal device can start or restart the first UL alignment timer upon receiving the first indication information associated with the first TAG or the first UL alignment timer. As such, it is possible to avoid expiry of the first alignment timer due to failure to be updated, and the MAC entity will not consider a serving cell group associated with the first UL alignment timer to be UL timing misaligned, so as to avoid flushing all HARQ buffers, releasing the PUCCH, releasing the SRS, clearing the preconfigured DL transmission, the preconfigured UL grant, and the PUSCH resource for the semi-persistent CSI report.

Implementation 2

Optionally, the terminal device starts or restarts the first UL alignment timer upon receiving the second indication information. The second indication information is associated with the first TAG or the first UL alignment timer, and the second indication information is carried in the TAC MAC CE.

It should be noted that, since the second indication information is carried in the TAC MAC CE, the terminal device starting or restarting the first UL alignment timer upon receiving the second indication information can also be described as the terminal device starting or restarting the first UL alignment timer upon receiving the TAC MAC CE.

It should be noted that, the second indication information is used to trigger the terminal device to start or restart the first UL alignment timer.

It should be noted that, the second indication information being associated with the first TAG or the first UL alignment timer means that the second indication information is associated with the first TAG, and since the first TAG is associated with the first UL alignment timer, the second indication information can trigger the terminal device to start or restart the first UL alignment timer.

It should be noted that, the second indication information being associated with the first UL alignment timer means that the second indication information is used to trigger the terminal device to start or restart the first UL alignment timer. The second indication information being associated with the first UL alignment timer can also be described as the second indication information having an association relationship with the first UL alignment timer, or the second indication information corresponding to the first UL alignment timer, or the second indication information having a correspondence relationship with the first UL alignment timer, which is not limited herein.

It should be noted that, as stated before, the first TAG corresponds to the first UL alignment timer, and the second indication information can trigger the terminal device to start or restart the first UL alignment timer. Therefore, the second indication information is associated with the first TAG. The second indication information being associate with the first TAG can also be described as the second indication information having an association relationship with the first TAG, or the second indication information corresponding to the first TAG, or the second indication information having a correspondence relationship with the first TAG, which is not limited herein.

In one optional implementation, the second indication information includes the ID of the first TAG and first TAC information. The first TAC information is used for the terminal device to adjust the TA associated with the first TAG. Alternatively, the first TAC information is not used for the terminal device to adjust the TA associated with the first TAG.

Optionally, when the first TAC information is used for the terminal device to adjust the TA associated with the first TAG, the terminal device can adjust the TA associated with the first TAG according to the first TAC information, or the terminal device can adjust the TA associated with the first TAG according to the first TAC information and the GNSS of the terminal device, which is not limited in the disclosure.

Optionally, when the first TAC information is not used for the terminal device to adjust the TA associated with the first TAG, the terminal device can adjust the TA associated with the first TAG according to its own GNSS, which is not limited herein.

It should be noted that, the first TAC information being not used for the terminal device to adjust the TA associated with the first TAG can also be described as the first TAC being ignored.

Optionally, whether the first TAC information is used for the terminal device to adjust the TA associated with the first TAG can be preset or configured by the network device, which is not limited herein.

In another optional implementation, the second information is used to determine at least one of the following information: (1) TA information; (2) FO information; (3) TA drift information; (4) FO drift information; (5) timing offset Koffset information; (6) time reference information; (7) location information of a reference point; (8) an ID of the first TAG.

For illustration of the forgoing information, reference can be made to the illustration of the first indication information in Implementation 1, which will not be repeated herein.

As an example rather than limitation, the second indication information includes the ID of the first TAG. The terminal device starts or restarts the first UL alignment timer upon receiving the TAC MAC CE carrying the second indication information.

To be summarized, in this implementation, the terminal device can start or restart the first UL alignment timer according to the second indication information, that is, according to the TAC MAC CE. Furthermore, the terminal device can perform TA adjustment by using the TAC indication information in the TAC MAC CE, or perform TA adjustment without using the TAC indication information in the TAC MAC CE, thereby improving the flexibility of TA adjustment. Alternatively, the terminal device can reuse a scheme of starting or restarting the first UL alignment timer according to the TAC MAC CE, and enhance the TAC MAC CE for new requirements such as the NTN network, for example, determine at least one of the forgoing information (1) to (8).

Implementation 3

Optionally, the terminal device can start, restart, or stop the first UL alignment timer according to third indication information upon receiving the third indication information. The third indication information is associated with the first TAG or the first UL alignment timer.

Optionally, the third indication information indicates to start, restart, or stop the first UL alignment timer.

It should be noted that, the third indication information being associated with the first TAG or the first UL alignment timer means that since the third indication information is associated with the first TAG and the first TAG is associated with the first UL alignment timer, the third indication information can indicate the terminal device to start, restart, or stop the first UL alignment timer.

It should be noted that, the third indication information being associated with the first UL alignment timer means that the third indication information indicates the terminal device to start or restart the first UL alignment timer. The third indication information being associated with the first UL alignment timer can also be described as the third indication information and the first UL alignment timer being in an association relationship, or the third indication information corresponding to the first UL alignment timer, or the third indication information and the first UL alignment timer being in a correspondence relationship, which is not limited herein.

It should be noted that, as stated before, the first TAG corresponds to the first UL alignment timer, and the third indication information indicates the terminal device to start or restart the first UL alignment timer. Therefore, the third indication information can be regarded as being associated with the first TAG. The third indication information being associated with the first TAG can also be described as the third indication information and the first TAG having an association relationship, or the third indication information corresponding to the first TAG, or the third indication information and the first TAG having a correspondence relationship, which is not limited herein.

Optionally, the third indication information is carried in at least one of: a system message, RRC signaling, an MAC CE, a DCI, and a RS, which is not limited herein. For example, the third indication information is 2 bits information at a fixed location in the RRC signaling, and when the 2 bits information is "00", it indicates to start the first UL alignment timer, when the 2 bits information is "01", it indicates to restart the first UL alignment timer, and when the 2 bits information is "10", it indicates to stop the first UL alignment timer. Still another example, the third indication information includes 1 bit information, when the 1 bit information has a first preset value such as "1", it indicates to start or restart the first UL alignment timer, or when the 1 bit information has a second present value such as "0", it indicates to stop the first UL alignment timer. Still another example, the third indication information includes first parameter configuration, when the first parameter configuration is received, it indicates to start or restart the first UL alignment timer.

It should be noted that, since the third indication information can be carried in at least one of the system message, the RRC signaling, the MAC CE, the DCI, or the RS, the terminal device starting or restarting the first UL alignment timer according to the third indication information upon receiving the third indication information can also be described as the terminal device starting or restarting the first UL alignment timer according to the third indication information upon receiving at least one of the system message, the RRC signaling, the MAC CE, the DCI, or the RS which carries the third indication information, which is not limited herein.

As an example rather than limitation, the third indication information includes the ID of the first TAG or 1 bit indication information. Upon receiving the system message, the RRC signaling, the MAC CE, the DCI, or the RS which carries the third indication information, if the 1 bit indicates a first preset value, the terminal device starts or restarts the first UL alignment timer, or if the 1 bit indicates a second present value, the terminal device stops the first UL alignment timer.

To be summarized, in the disclosure, upon receiving the third indication information associated with the first TAG or the first UL alignment timer, the terminal device can start or restart the first UL alignment timer according to the third indication information, to avoid expiry of the first UL alignment timer due to failure to be updated, and the MAC entity will not consider a serving cell group associated with the first UL alignment timer to be UL timing misaligned, so as to avoid flushing all HARQ buffers, releasing the PUCCH, releasing the SRS, clearing the preconfigured DL transmission, the preconfigured UL grant, and the PUSCH resource for semi-persistent CSI report.

Implementation 4

Optionally, the terminal device can determine to start, restart, or stop the first UL alignment timer.

Optionally, the terminal device can adjust the TA associated with the first TAG according to the GNSS of the terminal device, but this disclosure is not limited thereto.

Optionally, the terminal device can start, restart, or stop the first UL alignment timer after adjusting the TA associated with the first TAG according to the GNSS of the terminal device, but which is not limited.

Optionally, the terminal device can transmit fourth indication information to the network device, and the fourth indication information is used to determine at least one of the following information: (1) an ID of the first TAG; (2) the first UL alignment timer has been started; (3) the first UL alignment timer has been restarted; or (4) the first UL alignment timer has been stopped.

Optionally, the ID of the first TAG can indicates that the first UL alignment timer has been started, restarted, or stopped.

As an example rather than limitation, the third indication information includes the ID of the first TAG and 1 bit indication information. If the 1 bit indicates a first preset value such as "1", it indicates that the terminal device has started or restarted the first UL alignment timer; or if the 1 bit indicates a second preset value such as "0", it indicates that the terminal device has stopped the first UL alignment timer.

To be summarized, in this implementation, the terminal device can transmit the fourth indication information to the network device, such that in terms of how long the MAC entity considers the serving cell associated with the first TAG to be in UL timing alignment, the terminal device and the network device can have consistent understanding, which facilitates the network device to perform uplink scheduling on the terminal device.

Figure 5:
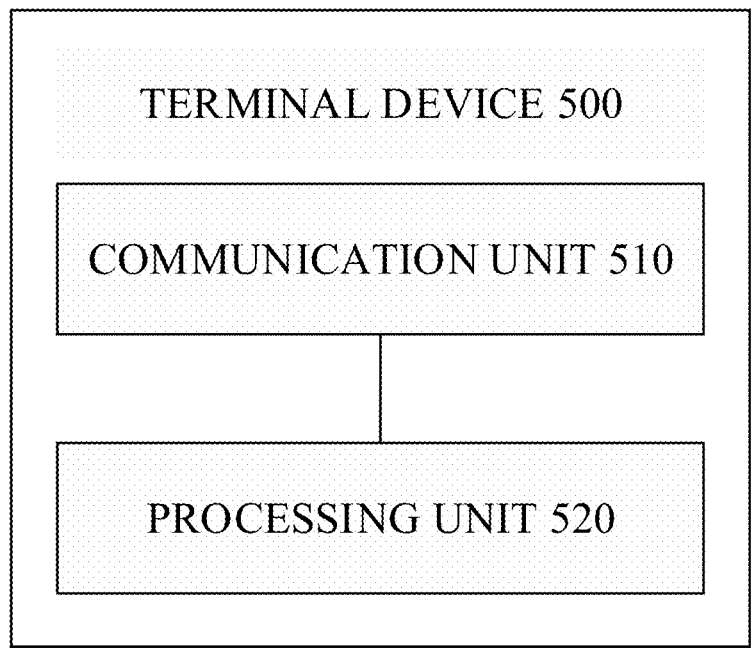
FIG. 5 is a schematic block diagram illustrating a terminal device 500 according to implementations of the disclosure.

FIG. 5 is a schematic block diagram illustrating a terminal device 500 according to implementations of the disclosure. As illustrated in FIG. 5, the terminal device 500 includes a communication unit 510, which is configured to obtain a first UL alignment timer. The first UL alignment timer corresponds to a first TAG, the first TAG corresponds to a first serving cell group, the first serving cell group includes at least one serving cell, and the first UL alignment timer is used for UL synchronization maintenance for the at least one serving cell in the first serving cell group.

Optionally, the first alignment timer has a duration configured to be infinity.

Optionally, the terminal device further includes a processing unit 520, which is configured to start or restart the first UL alignment timer, upon receiving first indication information by the communication unit, where the first indication information is associated with the first TAG or the first UL alignment timer.

Optionally, the first indication information is used for determining at least one of: TA information; FO information; TA drift information; FO drift information; timing offset information; time reference information; location information of a reference point; or an ID of the first TAG.

Optionally, the first indication information is carried in at least one of: a system message, RRC signaling, an MAC CE, a DCI, or a RS.

Optionally, the terminal device further includes a processing unit 520, which is configured to start or restart the first UL alignment timer, upon receiving second indication information by the communication unit, where the second indication information is associated with the first TAG or the first UL alignment timer, and is carried in a TAC MAC CE.

Optionally, the second indication information includes first TAC information and an ID of the first TAG. The first TAC information is used for the terminal device to adjust a TA associated with the first TAG. Alternatively, the first TAC information is not used for the terminal device to adjust the TA associated with the first TAG.

Optionally, whether the first TAC information is used for the terminal device to adjust the TA associated with the first TAG is configured by a network device or pre-set.

Optionally, the second indication information is used for determining at least one of: TA information; FO information; TA drift information; FO drift information; timing offset information; time reference information; location information of a reference point; or an ID of the first TAG.

Optionally, the terminal device further includes a processing unit 520, which is configured to start or restart the first UL alignment timer according to third indication information, upon receiving the third indication information by the communication unit, where the third indication information is associated with the first TAG or the first UL alignment timer.

Optionally, the third indication information indicates to start, restart, or stop the first UL alignment timer.

Optionally, the third indication information is carried in at least one of: a system message, RRC signaling, an MAC CE, a DCI, or a RS.

Optionally, the TA information includes at least one of: a cell common TA, a beam common TA, or a feedlink TA.

Optionally, the processing unit 520 is further configured to: adjust a TA associated with the first TAG according to the TA information, or adjust the TA associated with the first TAG according to the TA information and a GNSS of the terminal device.

Optionally, the terminal device further includes a processing unit 520, which is configured to start, restart, or stop the first UL alignment timer.

Optionally, the communication unit 510 is further configured to transmit fourth indication information to the network device. The fourth indication information is used for determining at least one of: an ID of the first TAG; the first UL alignment timer has been started; the first UL alignment timer has been restarted; or the first UL alignment timer has been stopped.

Optionally, the processing unit 520 is further configured to adjust a TA associated with the first TAG according to a GNSS of the terminal device.

Optionally, the communication unit 510 is configured to obtain the first UL alignment timer according to RRC configuration information of a network device.

Optionally, the first UL alignment timer being used for UL synchronization maintenance for the at least one serving cell in the first serving cell group includes: after expiry of the first alignment timer, for the at least one serving cell, behaviors of the terminal device include at least one of: flushing all HARQ buffers; notifying RRC to release a PUCCH, if the PUCCH is configured; notifying the RRC to release a SRS, if the SRS is configured; clearing any preconfigured DL transmission and preconfigured UL grant; clearing any PUSCH resource for semi-persistent CSI report.

Optionally, the terminal device is a terminal device in an NTN.

Optionally, in some implementations, the communication unit can be a communicating interface or a transceiver, or an input-output (I/O) interface of a communication chip or system on chip. The processing unit can be one or more processors.

It should be noted that, the terminal device 500 in implementations of the disclosure can correspond to the foregoing terminal device in the method implementation of FIG. 4. The foregoing and other operations and/or functions of each unit in the terminal device 500 are intended to implement corresponding processes of the terminal device in the method implementation corresponding to FIG. 4 respectively, and will not described herein again for brevity.

Figure 6:
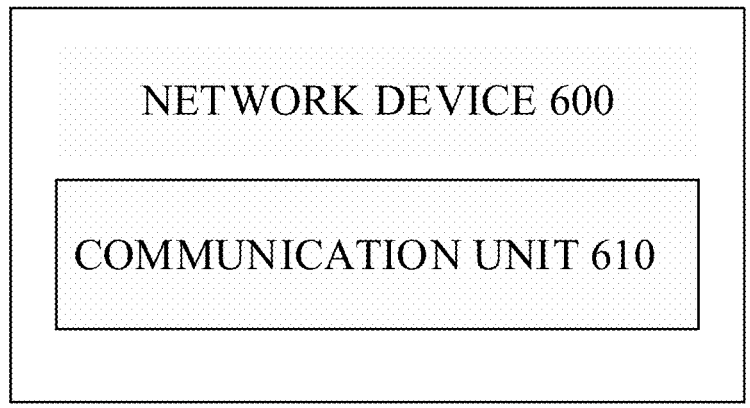
FIG. 6 is a schematic block diagram illustrating a network device 600 according to implementations of the disclosure.

FIG. 6 is a schematic block diagram illustrating a network device 600 according to implementations of the disclosure. As illustrated in FIG. 6, the network device 600 includes a communication unit 610, which is configured to configure a first UL alignment timer for a terminal device. The first UL alignment timer corresponds to a first TAG, the first TAG corresponds to a first serving cell group, the first serving cell group includes at least one serving cell, and the first UL alignment timer is used for UL synchronization maintenance for the at least one serving cell in the first serving cell group.

Optionally, the first alignment timer has a duration configured to be infinity.

Optionally, the communication unit 610 is further configured to transmit first indication information to the terminal device. The first indication information is used to trigger the terminal device to start or restart the first UL alignment timer. The first indication information is associated with the first TAG or the first UL alignment timer.

Optionally, the first indication information is used for determining at least one of: TA information; FO information; TA drift information; FO drift information; timing offset information; time reference information; location information of a reference point; or an ID of the first TAG.

Optionally, the first indication information is carried in at least one of: a system message, RRC signaling, an MAC CE, a DCI, or a RS.

Optionally, the communication unit 610 is further configured to transmit second indication information to the terminal device. The second indication information is used to trigger the terminal device to start or restart the first UL alignment timer. The second indication information is associated with the first TAG or the first UL alignment timer, and is carried in a TAC MAC CE.

Optionally, the second indication information includes first TAC information and an ID of the first TAG. The first TAC information is used for the terminal device to adjust a TA associated with the first TAG. Alternatively, the first TAC information is not used for the terminal device to adjust the TA associated with the first TAG.

Optionally, whether the first TAC is used for the terminal device to adjust the TA associated with the first TAG is configured by a network device or pre-set.

Optionally, the second indication information is used for determining at least one of: TA information; FO information; TA drift information; FO drift information; timing offset information; time reference information; location information of a reference point; or an ID of the first TAG.

Optionally, the communication unit 610 is further configured to transmit third indication information to the terminal device. The third indication information is used to trigger the terminal device to start, restart, or stop the first UL alignment timer according to the third indication information. The third indication information is associated with the first TAG or the first UL alignment timer.

Optionally, the third indication information is carried in at least one of: a system message, RRC signaling, an MAC CE, a DCI, or a RS.

Optionally, the TA information includes at least one of: a cell common TA, a beam common TA, or a feedlink TA.

Optionally, the TA is used to adjust the TA associated with the first TAG.

Optionally, the communication unit 610 is further configured to receive fourth indication information. The fourth indication information is used for determining at least one: an ID of the first TAG; the first UL alignment timer has been started; the first UL alignment timer has been restarted; or the first UL alignment timer has been stopped.

Optionally, the processing unit 610 is configured to configure the first UL alignment timer for the terminal device through RRC configuration information.

Optionally, the first UL alignment timer being used for UL synchronization maintenance for the at least one serving cell in the first serving cell group includes: after expiry of the first alignment timer, for the at least one serving cell, behaviors of the terminal device include at least one of: flushing all HARQ buffers; notifying RRC to release a PUCCH, if the PUCCH is configured; notifying the RRC to release a SRS, if the SRS is configured; clearing any preconfigured DL transmission and preconfigured UL grant; clearing any PUSCH resource for semi-persistent CSI report.

Optionally, the network device is a network device in an NTN.

Optionally, in some implementations, the communication unit can be a communicating interface or a transceiver, or an input-output (I/O) interface of a communication chip or system on chip. The processing unit can be one or more processors.

It should be noted that, the terminal device 600 in implementations of the disclosure can correspond to the method implementation of the network device side. The foregoing and other operations and/or functions of each unit in the terminal device 600 are intended to implement corresponding processes of the network device in the method implementation at the network side respectively, and will not described herein again for brevity.

Figure 7:
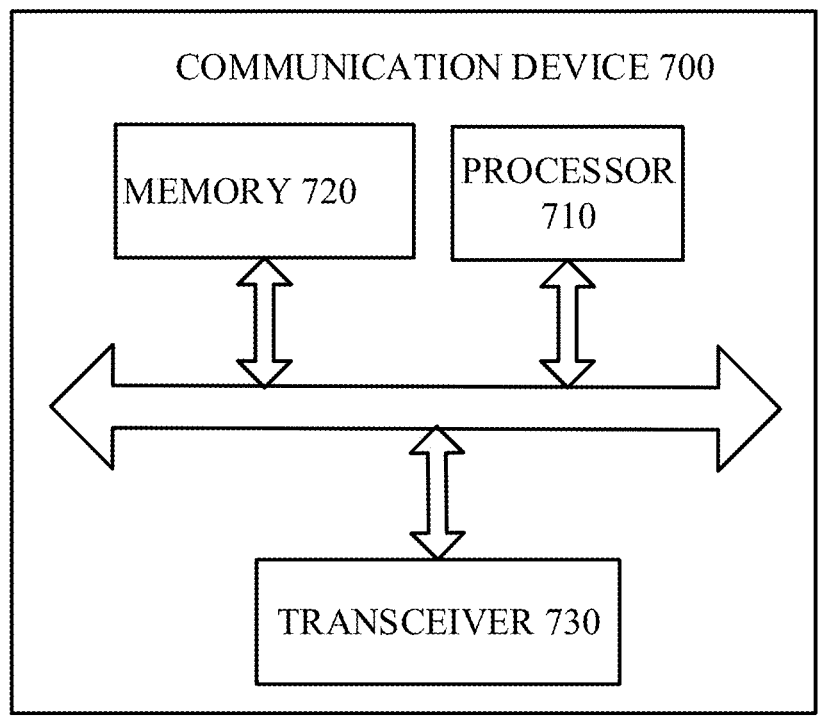
FIG. 7 is a schematic block diagram illustrating a communication device 700 provided in implementations of the disclosure.

FIG. 7 is a schematic structural diagram of a communication device 700 provided in implementations of the disclosure. The communication device 700 illustrated in FIG. 7 includes a processor 710. The processor 710 can invoke and execute computer programs stored in a memory, to perform the method in implementations of the disclosure.

Optionally, as illustrated in FIG. 7, the communication device 700 may further include a memory 720. The processor 710 can invoke and execute the computer programs stored in the memory 720, to perform the method in implementations of the disclosure.

The memory 720 may be a separate device independent of the processor 710, or may be integrated into the processor 710.

Optionally, as illustrated in FIG. 7, the communication device 700 can further include a transceiver 730. The processor 710 can control the transceiver 730 to communicate with other devices, specifically, to transmit information or data to other devices or to receive information or data transmitted by other devices.

The transceiver 730 may include a transmitter and a receiver. The transceiver 730 may further include an antenna, where one or more antennas can be provided.

Optionally, the communication device 700 may be operable as the network device in implementations of the disclosure, and the communication device 700 can implement the operations performed by the network device in various methods in implementations of the disclosure, which will not be repeated herein for the sake of simplicity.

Optionally, the communication device 700 may be operable as the terminal device in implementations of the disclosure, and the communication device 700 can implement the operations performed by the terminal device in various methods in implementations of the disclosure, which will not be repeated herein for the sake of simplicity.

Figure 8:
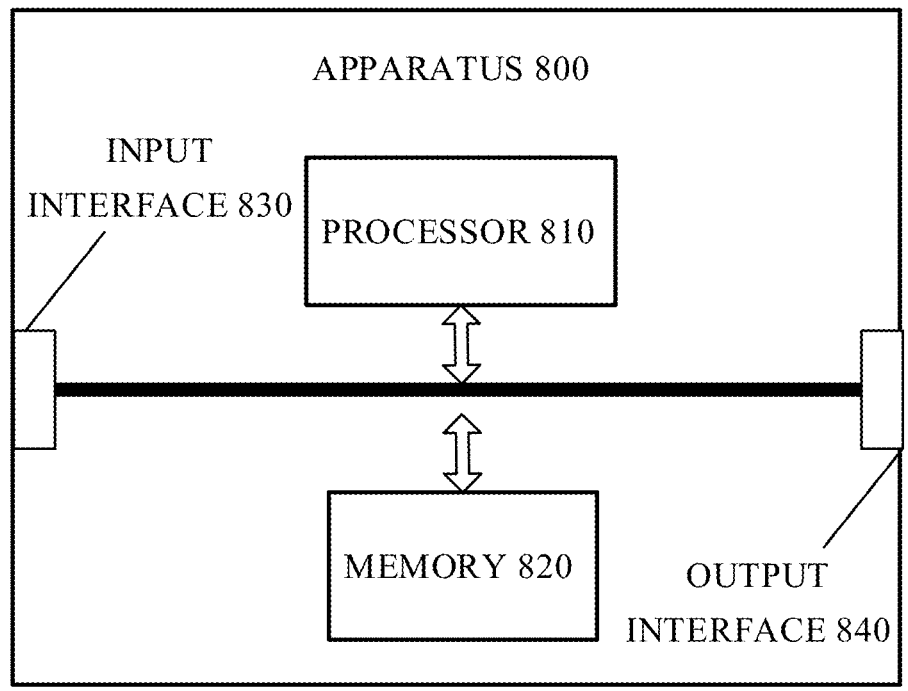
FIG. 8 is a schematic structural diagram illustrating an apparatus provided in implementations of the disclosure.

FIG. 8 is a schematic structural diagram of an apparatus according to implementations of the disclosure. The apparatus 800 illustrated in FIG. 8 includes a processor 810. The processor 810 can invoke and execute computer programs stored in a memory to perform the method in implementations of the disclosure.

Optionally, as illustrated in FIG. 8, the apparatus 800 further includes the memory 820. The processor 810 can invoke and execute the computer programs stored in the memory 820 to perform the method in implementations of the disclosure.

The memory 820 may be a separate device independent of the processor 810, or may be integrated into the processor 810.

Optionally, the apparatus 800 may further include an input interface 830. The processor 810 can control the input interface 830 to communicate with other devices or chips, specifically, to obtain information or data transmitted by other devices or chips.

Optionally, the apparatus 800 may further include an output interface 840. The processor 810 can control the output interface 840 to communicate with other devices or chips, specifically, to output information or data to other devices or chips.

Optionally, the apparatus is applicable to the network device in implementations of the disclosure. The apparatus can implement the operations performed by the network device in various methods in implementations of the disclosure, which will not be repeated herein for the sake of simplicity.

Optionally, the apparatus is applicable to the terminal device in implementations of the disclosure. The apparatus can implement the operations performed by the terminal device in various methods in implementations in the disclosure, which will not be repeated herein for the sake of simplicity.

Optionally, the apparatus referred to in implementations of the disclosure may also be a chip, which may be, for example, a system on chip (SOC).

Figure 9:
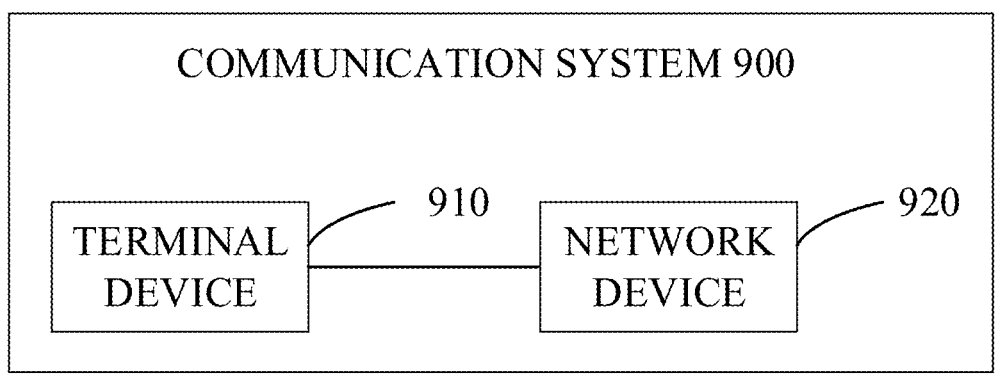
FIG. 9 is a schematic block diagram illustrating a communication system 900 provided in implementations of the disclosure.

FIG. 9 is a schematic block diagram of a communication system 900 provided in implementations of the disclosure. As illustrated in FIG. 9, the communication system 900 includes a terminal device 910 and a network device 920.

The terminal device 910 can implement functions of the terminal device in the foregoing methods, and the network device 920 can implement functions of the network device or the base station in the foregoing methods, which will not be repeated herein for the sake of simplicity.

It should be understood that, the processor in implementations of the disclosure may be an integrated circuit chip with signal processing capabilities. During implementation, each step of the foregoing method implementations may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations of the disclosure can be implemented or executed. The general-purpose processor may be a microprocessor, or the processor may be any conventional processor or the like. The steps of the method disclosed in implementations of the disclosure may be directly implemented by a hardware decoding processor, or may be performed by hardware and software modules in the decoding processor. The software module can be located in a mature storage medium in the art such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or a flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the memory above is intended for illustration rather than limitation. For example, the memory in implementations of the disclosure may also be a static RAM (SRAM), a DRAM, an SDRAM, a DDR SDRAM, an ESDRAM, an SLDRAM, a DR RAM, etc. In other words, the memory in implementations of the disclosure is intended to include, but is not limited to, these and any other suitable types of memory.

Implementations of the disclosure further provide a computer-readable storage medium. The computer-readable storage medium is configured to store computer programs.

Optionally, the computer-readable storage medium is applicable to the network device or the base station of implementations of the disclosure. The computer programs are operable with a computer to implement the operations performed by the network device or the base station in various methods in implementations of the disclosure, which will not be repeated herein for the sake of simplicity.

Optionally, the computer-readable storage medium is applicable to the mobile terminal/the terminal device of implementations of the disclosure. The computer programs are operable with a computer to implement the operations performed by the mobile terminal/the terminal device in various methods in implementations of the disclosure, which will not be repeated herein for the sake of simplicity.

Implementations of the disclosure further provide a computer program product. The computer program product includes computer program instructions.

Optionally, the computer program product is applicable to the network device or the base station of implementations of the disclosure. The computer program instructions are operable with a computer to implement the operations performed by the network device or the base station in various methods in implementations of the disclosure, which will not be repeated herein for the sake of simplicity.

Optionally, the computer program product is applicable to the mobile terminal/the terminal device of implementations of the disclosure. The computer program instructions are operable with a computer to implement the operations performed by the mobile terminal/the terminal device in various methods in implementations of the disclosure, which will not be repeated herein for the sake of simplicity.

Implementations of the disclosure further provide a computer program.

Optionally, the computer program is applicable to the network device or the base station of implementations of the disclosure. The computer program, when executed by a computer, is operable with the computer to implement the operations performed by the network device or the base station in various methods in implementations of the disclosure, which will not be repeated herein for the sake of simplicity.

Optionally, the computer program is applicable to the mobile terminal/the terminal device of implementations of the disclosure. The computer program, when executed by a computer, is operable with the computer to implement the operations performed by the mobile terminal/the terminal device in various methods in implementations of the disclosure, which will not be repeated herein for the sake of simplicity.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the specific working processes of the foregoing systems, apparatuses, and units, reference can be made to the corresponding processes of the above method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and there may be other manners of division available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces or units, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various implementations of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations of the disclosure. The above storage medium may include various kinds of media that can store program codes, such as a universal serial bus (USB), a mobile hard drive, a ROM, a RAM, a magnetic disk, or an optical disk.

While the disclosure has been described in connection with certain implementations, it is to be understood that the disclosure is not to be limited to the disclosed implementations but, on the contrary, is intended to cover various modifications and equivalent arrangements included within the scope of the appended claims, which occurs to those of ordinary skill in the art. Therefore, the protection scope of the disclosure shall be subject to the protection scope of claims.

What is claimed is:

1. A wireless communication method, comprising:

obtaining, by a terminal device, a first uplink (UL) alignment timer, wherein the first UL alignment timer corresponds to a first timing advance group (TAG), the first TAG corresponds to a first serving cell group, the first serving cell group comprises at least one serving cell, and the first UL alignment timer is used for UL synchronization maintenance for the at least one serving cell in the first serving cell group; and starting, restarting, or stopping, by the terminal device, the first UL alignment timer according to third indication information, upon receiving the third indication information, wherein the third indication information is associated with the first TAG or the first UL alignment timer, wherein the third indication information is carried in a system message.

2. The method of claim 1, further comprising:
starting or restarting, by the terminal device, the first UL alignment timer, upon receiving first indication information, wherein the first indication information is associated with the first TAG or the first UL alignment timer.

3. The method of claim 2, wherein the first indication information is used for determining at least one of:
timing advance (TA) information;
frequency offset (FO) information;
TA drift information;
FO drift information;
timing offset information;
time reference information;
location information of a reference point; or
an identification (ID) of the first TAG.

4. The method of claim 3, wherein the TA information comprises at least one of: a cell common TA, a beam common TA, or a feedlink TA.

5. The method of claim 3, further comprising:
adjusting, by the terminal device, a TA associated with the first TAG according to the TA information; or
adjusting, by the terminal device, the TA associated with the first TAG according to the TA information and a global navigation satellite system (GNSS) of the terminal device.

6. The method of claim 2, wherein the first indication information is carried in at least one of: a system message, radio resource control (RRC) signaling, a medium access control control-element (MAC CE), downlink control information (DCI), or a reference signal (RS).

7. The method of claim 1, wherein the third indication information indicates to start, restart, or stop the first UL alignment timer.

8. The method of claim 1, wherein obtaining, by the terminal device, the first UL alignment timer comprises:
obtaining, by the terminal device, the first UL alignment timer according to RRC configuration information of a network device.

9. A wireless communication method, comprising:
configuring, by a network device, a first uplink (UL) alignment timer for a terminal device, wherein the first UL alignment timer corresponds to a first timing advance group (TAG), the first TAG corresponds to a first serving cell group, the first serving cell group comprises at least one serving cell, and the first UL alignment timer is used for UL synchronization maintenance for the at least one serving cell in the first serving cell group; and
transmitting, by the network device, third indication information to the terminal device, wherein the third indication information indicates that the terminal device starts, restarts, or stops the first UL alignment timer according to the third indication information, and the third indication information is associated with the first TAG or the first UL alignment timer,
wherein the third indication information is carried in a system message.

10. The method of claim 9, further comprising:
transmitting, by the network device, first indication information to the terminal device, wherein the first indication information triggers the terminal device to start or restart the first UL alignment timer, and the first indication information is associated with the first TAG or the first UL alignment timer.

11. The method of claim 10, wherein the first indication information is used for determining at least one of:
timing advance (TA) information;
frequency offset (FO) information;
TA drift information;
FO drift information;
timing offset information;
time reference information;
location information of a reference point; or
an identification (ID) of the first TAG.

12. The method of claim 11, wherein the TA information comprises at least one of: a cell common TA, a beam common TA, or a feedlink TA.

13. The method of claim 11, wherein the TA information is used for adjustment of TA associated with the first TAG.

14. The method of claim 10, wherein the first indication information is carried in at least one of: a system message, radio resource control (RRC) signaling, a medium access control control-element (MAC CE), downlink control information (DCI), or a reference signal (RS).

15. A terminal device, comprising:
at least one processor; and
a memory storing computer programs which, when executed by the at least one processor, are operable with the processor to:
obtain a first uplink (UL) alignment timer, wherein the first UL alignment timer corresponds to a first timing advance group (TAG), the first TAG corresponds to a first serving cell group, the first serving cell group comprises at least one serving cell, and the first UL alignment timer is used for UL synchronization maintenance for the at least one serving cell in the first serving cell group;
start, restart, or stop the first UL alignment timer according to third indication information, upon receiving the third indication information, wherein the third indication information is associated with the first TAG or the first UL alignment timer,
wherein the third indication information is carried in a system message.

16. A network device, comprising a processor and a memory, wherein the memory is configured to store computer programs, and the processor is configured to invoke and run the computer programs stored in the memory to execute the method of claim 9.

* * * * *